(12) United States Patent
Zhang et al.

(10) Patent No.: US 10,990,670 B2
(45) Date of Patent: Apr. 27, 2021

(54) VIRTUAL NETWORK FUNCTION AUDIT METHOD AND APPARATUS

(71) Applicant: Huawei Technologies Co., Ltd., Shenzhen (CN)

(72) Inventors: Bo Zhang, Nanjing (CN); Yuming Xie, Nanjing (CN); Zhigang Huang, Nanjing (CN); Yang Wang, Shenzhen (CN); Liang Xia, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 321 days.

(21) Appl. No.: 16/185,971

(22) Filed: Nov. 9, 2018

(65) Prior Publication Data

US 2019/0080084 A1 Mar. 14, 2019

Related U.S. Application Data

(63) Continuation of application No. PCT/CN2017/082843, filed on May 3, 2017.

(30) Foreign Application Priority Data

May 10, 2016 (CN) .......................... 201610304572.8

(51) Int. Cl.
*G06F 21/55* (2013.01)
*H04L 12/24* (2006.01)
*H04L 29/08* (2006.01)

(52) U.S. Cl.
CPC .......... *G06F 21/552* (2013.01); *G06F 21/554* (2013.01); *H04L 41/064* (2013.01);
(Continued)

(58) Field of Classification Search
CPC ................. G06F 21/552; G06F 21/554; G06F 2221/034; G06F 2221/2101; H04L 41/064; H04L 41/028; H04L 41/0816; H04L 67/16
(Continued)

(56) References Cited

U.S. PATENT DOCUMENTS

| 5,884,284 A * | 3/1999 | Peters ................. G06Q 30/0283 |
| | | 348/E7.049 |
| 7,340,776 B2 * | 3/2008 | Zobel .................... G06F 21/577 |
| | | 713/188 |

(Continued)

FOREIGN PATENT DOCUMENTS

| CN | 102750475 A | 10/2012 |
| CN | 104331662 A | 2/2015 |

OTHER PUBLICATIONS

TaheriMonfared, Aryan, and Chunming Rong. "Multi-tenant network monitoring based on software defined networking." OTM Confederated International Conferences "On the Move to Meaningful Internet Systems". Springer, Berlin, Heidelberg, 2013. (Year: 2013).*

(Continued)

*Primary Examiner* — Syed A Zaidi
(74) *Attorney, Agent, or Firm* — Conley Rose, P.C.

(57) ABSTRACT

A virtual network function (VNF) audit method and apparatus, used to audit a VNF generated by a platform that includes an authentication and authorization component, a service component, and a virtualized infrastructure. The method includes receiving an event reported by the authentication and authorization component, receiving an event reported by the service component, and receiving an event reported by the virtualized infrastructure, obtaining an event occurrence sequence of each VNF according to all received events, and auditing the event occurrence sequence of each (Continued)

VNF to obtain an audit result of the VNF. According to the method, the events that are distributed in different components are integrated into one event occurrence sequence in order to visually and quickly detect a malicious VNF generated by bypassing a component, and more comprehensively detect the malicious VNF, thereby reducing a missed detection rate of a VNF operation audit.

20 Claims, 3 Drawing Sheets

(52) U.S. Cl.
CPC .......... *H04L 41/0816* (2013.01); *H04L 41/28* (2013.01); *H04L 67/16* (2013.01); *G06F 2221/034* (2013.01); *G06F 2221/2101* (2013.01)

(58) Field of Classification Search
USPC .......................................................... 726/23
See application file for complete search history.

(56) References Cited

U.S. PATENT DOCUMENTS

| | | | | |
|---|---|---|---|---|
| 8,341,123 | B2* | 12/2012 | Irving | G06F 16/16 707/648 |
| 8,401,982 | B1 | 3/2013 | Satish et al. | |
| 9,536,084 | B1* | 1/2017 | Lukacs | G06F 21/53 |
| 9,853,869 | B1* | 12/2017 | Shaham | H04L 41/5054 |
| 2002/0147803 | A1* | 10/2002 | Dodd | G06F 21/577 709/223 |
| 2003/0154404 | A1* | 8/2003 | Beadles | H04L 63/20 726/1 |
| 2007/0070066 | A1* | 3/2007 | Bakhash | G06F 3/04815 345/419 |
| 2015/0013008 | A1* | 1/2015 | Lukacs | G06F 21/566 726/24 |
| 2015/0142940 | A1* | 5/2015 | McMurry | H04L 41/0853 709/223 |
| 2015/0180730 | A1* | 6/2015 | Felstaine | G06F 11/0709 709/225 |
| 2015/0288541 | A1 | 10/2015 | Fargano et al. | |
| 2016/0028758 | A1* | 1/2016 | Ellis | H04L 63/1433 726/25 |
| 2016/0112443 | A1 | 4/2016 | Grossman et al. | |
| 2016/0359872 | A1* | 12/2016 | Yadav | H04L 43/04 |
| 2016/0373474 | A1* | 12/2016 | Sood | G06F 21/50 |
| 2017/0039644 | A1* | 2/2017 | Palmer | G06Q 40/04 |

OTHER PUBLICATIONS

NPL Search Terms (Year: 2020).*
NPL Search Terms (Year: 2021).*
Machine Translation and Abstract of Chinese Publication No. CN102750475, Oct. 24, 2012, 18 pages.
Machine Translation and Abstract of Chinese Publication No. CN104331662, Feb. 4, 2015, 13 pages.
"Network Functions Virtualisation (NFV); NFV Security; Problem Statement," ETSI GS NFV-SEC 001, V1.1.1, Oct. 2014, 37 pages.
Foreign Communication From A Counterpart Application, PCT Application No. PCT/CN2017/082843, English Translation of International Search Report dated Jun. 30, 2017, 2 pages.
Foreign Communication From A Counterpart Application, PCT Application No. PCT/CN2017/082843, English Translation of Written Opinion dated Jun. 30, 2017, 3 pages.
NEC Europe Ltd., et al., "Additional requirements to DGS/NFV-SEC008," Security monitoring report, XP14241877A, NFVSEC(15)000092, Apr. 2015, 2 pages.
"Network Functions Virtualisation (NFV); Security Report; Security Management and Monitoring for NFV(Release 2)," Draft ETSI GS NFV-SEC 013 v0.0.2, XP14272325, Mar. 2016, 41 pages.
Foreign Communication From A Counterpart Application, European Application No. 17795463.3, Extended European Search Report dated Dec. 14, 2018, 10 pages.

* cited by examiner

VIRTUAL NETWORK FUNCTION AUDIT METHOD AND APPARATUS

CROSS-REFERENCE TO RELATED APPLICATIONS

This application is a continuation of International Patent Application No. PCT/CN2017/082843 filed on May 3, 2017, which claims priority to Chinese Patent Application No. 201610304572.8 filed on May 10, 2016. The disclosures of the aforementioned applications are hereby incorporated by reference in their entireties.

TECHNICAL FIELD

The present disclosure relates to the virtual network field, and in particular, to a virtual network function (VNF) audit method and apparatus.

BACKGROUND

Generally, a conventional network device such as a router, a switch, or a firewall has a fixed network function such as support for various protocols, load balancing, or rate control, based on a function of hardware included in the device. This type of network device is difficult to upgrade and expand. In other approaches, network function virtualization is usually used to resolve the problem. A network function virtualization technology implements a VNF by creating a virtual machine in any network device. The VNF may be flexibly created according to a demand. There is no problem of upgrading and expansion.

However, compared with the conventional network device, this flexibility of the VNF results in an increase in network security management complexity. During implementation of the VNF, the virtual machine is usually established on an existing platform (for example, an OPEN-STACK cloud platform), and then the VNF is established using the virtual machine. For example, the existing OPEN-STACK cloud platform includes an authentication and authorization component, a service component, and a virtualized infrastructure. During VNF establishment, an authorized user needs to apply to the authentication and authorization component for a token, and the virtualized infrastructure controls the service component to verify token permission and completes the VNF establishment.

The service component of the platform may have a vulnerability. A malicious user can create a malicious VNF using the vulnerability of the service component. The malicious VNF attacks another authorized VNF or a host machine in order to obtain data of two communication parties, thereby causing user data leakage. In the other approaches, a skilled person usually analyzes event recording logs generated by each component during the VNF establishment one by one in order to find the malicious VNF. The method requires the skilled person to have a relatively high technical level, and has low efficiency. In addition, when any component of the platform is bypassed in an establishment process of the malicious VNF, the component does not generate any log. It is more difficult to find the malicious VNF when the skilled person checks an event recording log of only one component at a time. Consequently, detection using an existing malicious VNF audit method is incomprehensive, and a missed detection rate is high.

SUMMARY

Embodiments of the present disclosure provide a VNF audit method and apparatus in order to resolve a problem of incomprehensive detection and a high missed detection rate of an existing VNF audit method.

According to a first aspect, an embodiment of the present disclosure provides a VNF audit method, used to audit a VNF generated by a platform that includes an authentication and authorization component, a service component, and a virtualized infrastructure. The method includes receiving at least one authentication and authorization event that is triggered by a first VNF operation and reported by the authentication and authorization component, receiving at least one service event that is triggered by a second VNF operation and reported by the service component, and receiving at least one access event that is triggered by a third VNF operation and reported by the virtualized infrastructure, obtaining an event occurrence sequence of each VNF according to the at least one authentication and authorization event, the at least one service event, and the at least one access event, where an event occurrence sequence is used to indicate an occurrence order of multiple events corresponding to one VNF, and auditing the event occurrence sequence of each VNF to obtain an audit result of the VNF.

According to the method, the events reported by the authentication and authorization component, the service component, and the virtualized infrastructure are received, the event occurrence sequence that can indicate an occurrence order of events of each VNF is obtained according to all the received events, and finally the event occurrence sequence of each VNF is audited to obtain the audit result. Events that correspond to one VNF and that are distributed in different components are integrated into one event occurrence sequence in order to visually and quickly detect a malicious VNF generated by bypassing a component, and more comprehensively detect the malicious VNF, thereby reducing a missed detection rate of a VNF operation audit.

With reference to the first aspect, in a first possible implementation of the first aspect, a process of obtaining the event occurrence sequence includes classifying the at least one authentication and authorization event, the at least one service event, and the at least one access event according to a user identifier in event information corresponding to each of the at least one authentication and authorization event, the at least one service event, and the at least one access event, to obtain all events corresponding to each user identifier, analyzing, according to a VNF identifier included in event information corresponding to each event in all the events corresponding to each user identifier, all the events corresponding to the same user identifier to obtain all events corresponding to each VNF identifier, and sorting, according to occurrence time included in event information corresponding to each event in all events corresponding to a same VNF identifier, all the events corresponding to the same VNF identifier to obtain an event occurrence sequence of a VNF corresponding to each VNF identifier.

In the method, according to different user identifiers, VNF identifiers, and occurrence time of events, all the events are arranged to obtain event occurrence sequences with more obvious mutual relationships in order to improve an audit speed.

With reference to the first possible implementation of the first aspect, in a second possible implementation of the first aspect, the event information corresponding to each of the at least one authentication and authorization event, the at least one service event, and the at least one access event includes a module number invoked by a VNF operation corresponding to the event, and an audit process further includes determining, for the event occurrence sequence of each VNF, a module sequence constituted by module numbers that are invoked by VNF operations and that are included in event information corresponding to all events in the event occurrence sequence, determining whether the module sequence conforms to a preset module sequence, and obtaining an audit result that the VNF is a malicious VNF if the module sequence does not conform to the preset module sequence.

With reference to the first possible implementation of the first aspect, in a third possible implementation of the first aspect, the event information corresponding to each of the at least one authentication and authorization event, the at least one service event, and the at least one access event includes occurrence time of a VNF operation corresponding to the event, and an audit process further includes determining, for the event occurrence sequence of each VNF, execution duration of each event in the event occurrence sequence according to occurrence time included in event information corresponding to each event in the event occurrence sequence, determining whether the execution duration of each event is less than preset duration, and obtaining an audit result that the VNF is a malicious VNF if an event whose execution duration is greater than or equal to the preset duration exists.

With reference to the first possible implementation of the first aspect, in a fourth possible implementation of the first aspect, the event information corresponding to each of the at least one authentication and authorization event, the at least one service event, and the at least one access event includes an operation type and a user type of a VNF operation corresponding to the event, and an audit process further includes determining, for the event occurrence sequence of each VNF, a user type included in event information corresponding to each event in the event occurrence sequence and an operation type set corresponding to the user type, determining whether an operation type included in the event information corresponding to each event in the event occurrence sequence is in the operation type set corresponding to the user type included in the event information, and obtaining an audit result that the VNF is a malicious VNF when an operation type included in event information corresponding to at least one event is not in the operation type set corresponding to the user type included in the event information.

With reference to any one of the first aspect, or the first to the fourth possible implementations of the first aspect, in a fifth possible implementation of the first aspect, if the audit result is that the VNF is a malicious VNF, the method further includes outputting warning information.

With reference to any one of the first aspect, or the first to the fifth possible implementations of the first aspect, in a sixth possible implementation of the first aspect, the event information corresponding to each of the authentication and authorization event, the service event, and the access event includes at least one of a module number invoked by a VNF operation, a user identifier, a user type, an operation type, a VNF identifier, occurrence time, an operation result, or an image file type.

The following describes a VNF audit apparatus provided in an embodiment of the present disclosure. The apparatus is one-to-one corresponding to the method and is configured to implement the VNF audit method in the foregoing embodiment. The apparatus has a same technical feature and technical effect as the method, and details are not described in the embodiment of the present disclosure.

According to a second aspect, an embodiment of the present disclosure provides a VNF audit apparatus configured to audit a VNF generated by a platform that includes an authentication and authorization component, a service component, and a virtualized infrastructure. The apparatus includes a receiving module configured to receive at least one authentication and authorization event that is triggered by a first VNF operation and reported by the authentication and authorization component, receive at least one service event that is triggered by a second VNF operation and reported by the service component, and receive at least one access event that is triggered by a third VNF operation and reported by the virtualized infrastructure, a sorting module configured to obtain an event occurrence sequence of each VNF according to the at least one authentication and authorization event, the at least one service event, and the at least one access event, where an event occurrence sequence is used to indicate an occurrence order of multiple events corresponding to one VNF, and an audit module configured to audit the event occurrence sequence of each VNF to obtain an audit result of the VNF.

With reference to the second aspect, in a first possible implementation of the second aspect, the sorting module is further configured to classify the at least one authentication and authorization event, the at least one service event, and the at least one access event according to a user identifier in event information corresponding to each of the at least one authentication and authorization event, the at least one service event, and the at least one access event, to obtain all events corresponding to each user identifier, analyze, according to a VNF identifier included in event information corresponding to each event in all the events corresponding to each user identifier, all the events corresponding to the same user identifier to obtain all events corresponding to each VNF identifier, and sort, according to occurrence time included in event information corresponding to each event in all the events corresponding to each VNF identifier, all the events corresponding to each VNF identifier to obtain an event occurrence sequence of a VNF corresponding to each VNF identifier.

With reference to the first possible implementation of the second aspect, in a second possible implementation of the second aspect, the event information corresponding to each of the at least one authentication and authorization event, the at least one service event, and the at least one access event includes a module number invoked by a VNF operation corresponding to the event, and the audit module is further configured to determine, for the event occurrence sequence of each VNF, a module sequence constituted by module numbers that are invoked by VNF operations and that are included in event information corresponding to all events in the event occurrence sequence, determine whether the module sequence conforms to a preset module sequence, and obtain an audit result that the VNF is a malicious VNF if the module sequence does not conform to the preset module sequence.

With reference to the first possible implementation of the second aspect, in a third possible implementation of the second aspect, the event information corresponding to each of the at least one authentication and authorization event, the at least one service event, and the at least one access event includes occurrence time of a VNF operation corresponding to the event, and the audit module is further configured to determine, for the event occurrence sequence of each VNF, execution duration of each event in the event occurrence sequence according to occurrence time included in event information corresponding to each event in the event occurrence sequence, determine whether the execution duration of each event is less than preset duration, and obtain an audit result that the VNF is a malicious VNF if an event whose execution duration is greater than or equal to the preset duration exists.

With reference to the first possible implementation of the second aspect, in a fourth possible implementation of the second aspect, the event information corresponding to each of the at least one authentication and authorization event, the at least one service event, and the at least one access event includes an operation type and a user type of a VNF operation corresponding to the event, and the audit module is further configured to determine, for the event occurrence sequence of each VNF, a user type included in event information corresponding to each event in the event occurrence sequence and an operation type set corresponding to the user type, determine whether an operation type included in the event information corresponding to each event in the event occurrence sequence is in the operation type set corresponding to the user type included in the event information, and obtain an audit result that the VNF is a malicious VNF when an operation type included in event information corresponding to at least one event is not in the operation type set corresponding to the user type included in the event information.

With reference to any one of the second aspect, or the first to the fourth possible implementations of the second aspect, in a fifth possible implementation of the second aspect, if the audit result is that the VNF is a malicious VNF, the audit module is further configured to output warning information.

With reference to any one of the second aspect, or the first to the fifth possible implementations of the second aspect, in a sixth possible implementation of the second aspect, the event information corresponding to each of the authentication and authorization event, the service event, and the access event includes at least one of a module number invoked by a VNF operation, a user identifier, a user type, an operation type, a VNF identifier, occurrence time, an operation result, or an image file type.

According to a third aspect, an embodiment of the present disclosure provides a storage medium, where the storage medium stores one or more programs, the one or more programs include an instruction, and when the instruction is invoked by a processor in a host, the host is enabled to perform the VNF audit method in any one of the foregoing first aspect or the first to the sixth possible implementations of the first aspect.

The storage medium is configured to store the instruction that can be used to perform the implementations of the method in the foregoing first aspect. The storage medium has a same technical feature and technical effect as the method in the first aspect, and details are not described in the present disclosure.

BRIEF DESCRIPTION OF DRAWINGS

To describe the technical solutions in some of the embodiments of the present disclosure more clearly, the following briefly introduces the accompanying drawings describing some of the embodiments.

DESCRIPTION OF EMBODIMENTS

To make the purpose, technical solutions, and advantages of some of the embodiments of the present disclosure clearer, the following describes the technical solutions of some of the embodiments of the present disclosure with reference to the accompanying drawings in the embodiments of the present disclosure.

The embodiments of the present disclosure provide a VNF audit method and apparatus, used to audit a VNF generated by a platform that includes an authentication and authorization component, a service component, and a virtualized infrastructure, generate an event occurrence sequence of each VNF according to events reported by all components of the platform, and audit the event occurrence sequence of each VNF according to a preset policy in order to quickly and accurately detect a malicious VNF. An architecture of an audit system provided in the embodiments of the present disclosure is described in detail below.

Figure 1:
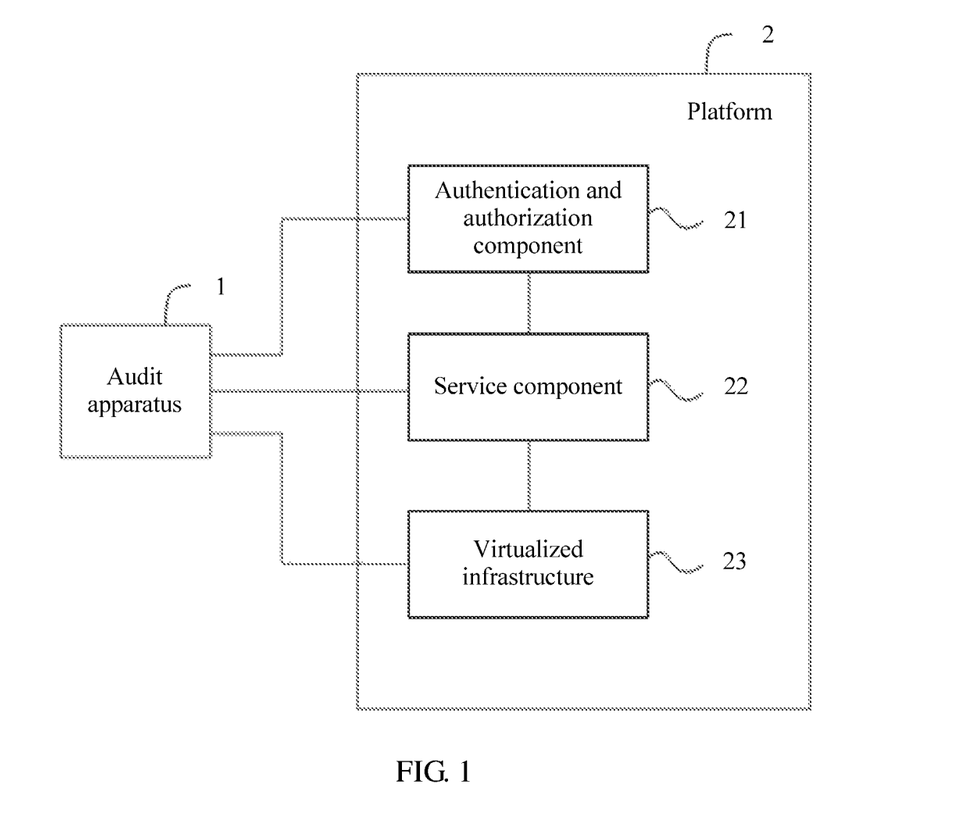
FIG. 1 is a schematic diagram of an architecture of an audit system according to an embodiment of the present disclosure.

FIG. 1 is a schematic diagram of an architecture of an audit system according to an embodiment of the present disclosure. As shown in FIG. 1, the system includes an audit apparatus 1 and a platform 2. The platform 2 includes an authentication and authorization component 21, a service component 22, and a virtualized infrastructure 23. The authentication and authorization component 21 is configured to authenticate a user and generate a user token. The service component 22 is configured to control the virtualized infrastructure 23 to create a virtual machine and implement a VNF, and monitor entire life cycles of the virtual machine and the VNF. The virtualized infrastructure 23 is configured to create the virtual machine and implement the VNF. When a user sends a VNF operation request to the service component 22, the service component 22 detects, according to the VNF operation request, whether the VNF operation request carries a token. If a token is not included, the service component 22 requires the user to be authenticated by the authentication and authorization component 21 and obtain a token. If the VNF operation request carries a token, the service component 22 verifies, according to the token in the VNF operation request, whether the user has permission to create a virtual machine. When the user has the permission to create a virtual machine, the service component 22 controls the virtualized infrastructure 23 to create the virtual machine and implement a VNF function specified in the VNF operation request.

For example, the platform 2 may be an OPENSTACK cloud platform. The authentication and authorization component 21 may be a keystone component or a moon component. The service component 22 includes a nova component, a glance component, or the like. The virtualized infrastructure 23 may be a Kernel-based Virtual Machine (KVM) component. When an authorized user creates a VNF, the authentication and authorization component 21, the service component 22, and the virtualized infrastructure 23 report events triggered by performing VNF operations to the audit apparatus 1. The audit apparatus 1 may further store all the reported events in a database. The VNF operation may be VNF creation, deletion, enabling, disabling, pause, restoration, or the like. Event information corresponding to each reported event includes at least one piece of information, a module number invoked by a VNF operation, a user identifier, a user type, an operation type, a VNF identifier, an image file type, occurrence time, an operation result, or the like. When sending a VNF operation request to the service component 22 or performing a malicious VNF operation, a malicious user usually bypasses (that is, avoids) a component in the platform 2 to complete virtual machine establishment and implement a VNF operation using a platform vulnerability, for example, bypassing the authentication and authorization component 21, or bypassing the virtualized infrastructure 23. In this case, the authentication and authorization component 21 or the virtualized infrastructure 23 reports no event. The audit apparatus 1 in this application can summarize all events to find a VNF event that bypasses a component in order to find a malicious VNF.

The VNF audit method provided in the embodiments of the present disclosure is described in detail below using a specific embodiment.

Figure 2:
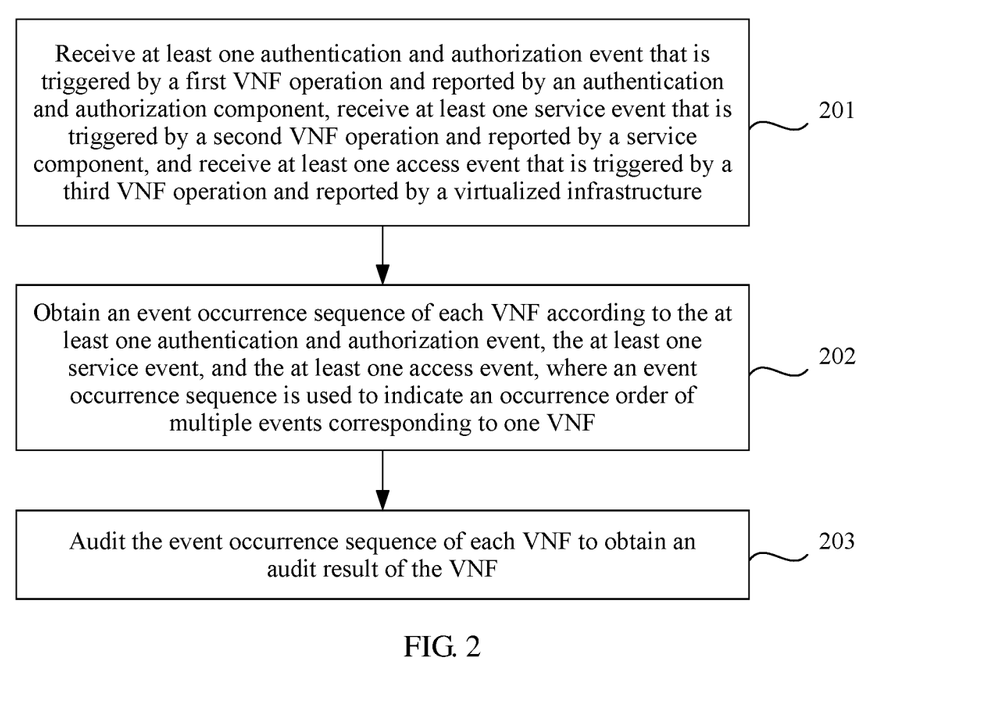
FIG. 2 is a schematic flowchart of a VNF audit method according to an embodiment of the present disclosure.

FIG. 2 is a schematic flowchart of a VNF audit method according to an embodiment of the present disclosure. The method is applied to the audit apparatus shown in FIG. 1. The audit apparatus may be implemented using software or hardware. As shown in FIG. 2, the method includes the following steps.

Step 201: Receive at least one authentication and authorization event that is triggered by a first VNF operation and reported by an authentication and authorization component, receive at least one service event that is triggered by a second VNF operation and reported by a service component, and receive at least one access event that is triggered by a third VNF operation and reported by a virtualized infrastructure.

The first VNF operation, the second VNF operation, and the third VNF operation may each include one or more VNF operations.

Step 202: Obtain an event occurrence sequence of each VNF according to the at least one authentication and authorization event, the at least one service event, and the at least one access event, where an event occurrence sequence is used to indicate an occurrence order of multiple events corresponding to one VNF.

Step 203: Audit the event occurrence sequence of each VNF to obtain an audit result of the VNF.

In step 201, the audit apparatus receives the events reported by the authentication and authorization component, the service component, and the virtualized infrastructure, and stores event information corresponding to each event. A user may initiate one or more VNF operations. Therefore, each component may report one or more events. When no component reports an event, it indicates that there is no VNF operation. For example, in this embodiment of the present disclosure, an event triggered by a VNF operation in the authentication and authorization component is recorded as an authentication and authorization event triggered by a first VNF operation. An event triggered by a VNF operation in the service component is recorded as a service event triggered by a second VNF operation. An event triggered by a VNF operation in the virtualized infrastructure is recorded as an access event triggered by a third VNF operation. The first VNF operation, the second VNF operation, and the third VNF operation herein may be different names of a same VNF operation performed in different components, or may be different VNF operations.

For example, the event information corresponding to the event reported to the audit apparatus by the authentication and authorization component, the service component, or the virtualized infrastructure includes at least one of a module number invoked by a VNF operation, a user identifier, a user type, an operation type, a VNF identifier, occurrence time, an operation result, or an image file type. Different user types correspond to different user permission. Different executable operation types correspond to different operation type sets. The user identifier is used to identify a user who initiates the VNF operation. The user type is used to indicate permission or a level of the user who initiates the VNF operation, and an operation type that can be executed by the user who initiates the VNF operation may be determined according to the user type. The operation type is used to indicate a type of the VNF operation initiated by the user. The VNF identifier is used to indicate a VNF related to the VNF operation. The occurrence time is used to indicate time when the VNF operation occurs. The operation result is used to indicate whether the VNF operation is successful. The image file type is used to indicate a type of an image file used when the VNF is created. The image file may be classified according to a network function.

The event information is described in detail below using the authentication and authorization component as an example. The event information corresponding to the event reported by the authentication and authorization component may be as follows.

{module number: 1; user identifier: admin1; user type: admin; operation type: create; VNF identifier: vRouter; time: 2015-12-20 15:10:27}.

The event information indicates that a user admin1 whose user type is admin creates a virtual router at 15:10:27 on Dec. 20, 2015.

In step 202, the event occurrence sequence of each VNF is obtained according to all the events received in step 201. An event occurrence sequence is used to indicate an occurrence order of multiple events corresponding to one VNF. Further, when an event occurrence sequence is obtained, all events that correspond to a same VNF and that are received by the audit apparatus may be sorted according to a chronological order of occurrence of the events. In the event occurrence sequence, events corresponding to the same VNF that occur in each component are sorted according to the chronological order. This facilitates a skilled person in examining events separately triggered by a same VNF operation request in the components. When the VNF operation is a malicious event, for example, deliberately bypassing a component, the skilled person can directly find the malicious event. Optionally, after the events are sorted according to the chronological order, all the reported events may be further arranged according to a parameter such as the user identifier or the VNF identifier of the VNF operation in order to obtain one or more event occurrence sequences, and further facilitate auditing by the skilled person.

In step 203, the event occurrence sequence of each VNF obtained in step 202 is audited to obtain the audit result. A specific audit policy may be as follows. Event information corresponding to each event in the event occurrence sequence corresponding to each VNF is audited according to a preset rule. When event information of a VNF includes information that does not conform to the preset rule, the audit result is that the VNF is a malicious VNF.

For example, the preset rule may be set according to at least one piece of information, a user identifier, a user type, an operation type, a VNF identifier, an image file type, a module number invoked by a VNF operation, or occurrence time.

When the preset rule is set according to the user identifier or the user type, the preset rule may be determining that a user identifier or a user type in the event information corresponding to each event in the event occurrence sequence is not in a blacklist. That is, when an operation user who is added to the blacklist once performs a VNF operation, it may be directly considered that the VNF operation does not conform to the preset rule, and warning information is output.

The operation type indicates an action of operating a VNF, and may be creation, deletion, enabling, disabling, pause, restoration, or the like. Different operation users or different roles may send different VNF operation requests to the service component. When a user role is an administrator, a VNF operation request of the user role may include creation, deletion, enabling, disabling, pause, restoration, or the like. When the user role is a VNF owner, the VNF operation request of the user role may be only enabling, disabling, suspending, or restoration.

The VNF identifier may indicate a set of VNFs with some attributes. Similarly, a VNF object that can be operated varies with the user type. The module number invoked by the VNF operation indicates a number of a module that needs to be passed when the VNF operation is performed. When the preset rule is set according to the module number, the preset rule may be set according to an order of modules that need to be passed when the VNF operation is performed, that is, numbers of modules successively corresponding to all events in an event occurrence sequence. Execution duration of each event in the event occurrence sequence may be determined according to the occurrence time. The preset rule may be set according to longest sustainable duration of an event.

Further, during auditing, the skilled person may perform the auditing according to the preset rule, or the auditing may be automatically performed according to one or more preset rules. An audit result includes there is a malicious VNF or there is no malicious VNF. The audit process may be performed in real time after the audit apparatus receives a reported event, or performed at an interval of a preset time period.

Optionally, after step 203, the audit method provided in this embodiment of the present disclosure further includes outputting warning information if the audit result is that the VNF is a malicious VNF When the event occurrence sequence of each VNF is audited, and multiple VNFs are found to be malicious VNFs, warning information including multiple malicious VNFs may be output, or warning information may be sent for each malicious VNF The warning information may include event information corresponding to an event that does not conform to the preset rule, and may further include the preset rule to which a determined malicious VNF does not conform such that the skilled person can quickly find and resolve the malicious VNF A specific output manner of the warning information may be displaying a warning information window, highlighting an event corresponding to a malicious VNF, or generating an alert.

According to the audit method provided in this embodiment of the present disclosure, the audit apparatus receives the events reported by the authentication and authorization component, the service component, and the virtualized infrastructure, obtains, according to all the received events, the event occurrence sequence that can indicate an occurrence order of events of each VNF, and finally audits the event occurrence sequence of each VNF to obtain the audit result. Events that correspond to one VNF and that are distributed in different components are integrated into one event occurrence sequence in order to visually and quickly detect a malicious VNF generated by bypassing a component, and more comprehensively detect the malicious VNF, thereby reducing a missed detection rate of a VNF operation audit.

Figure 3:
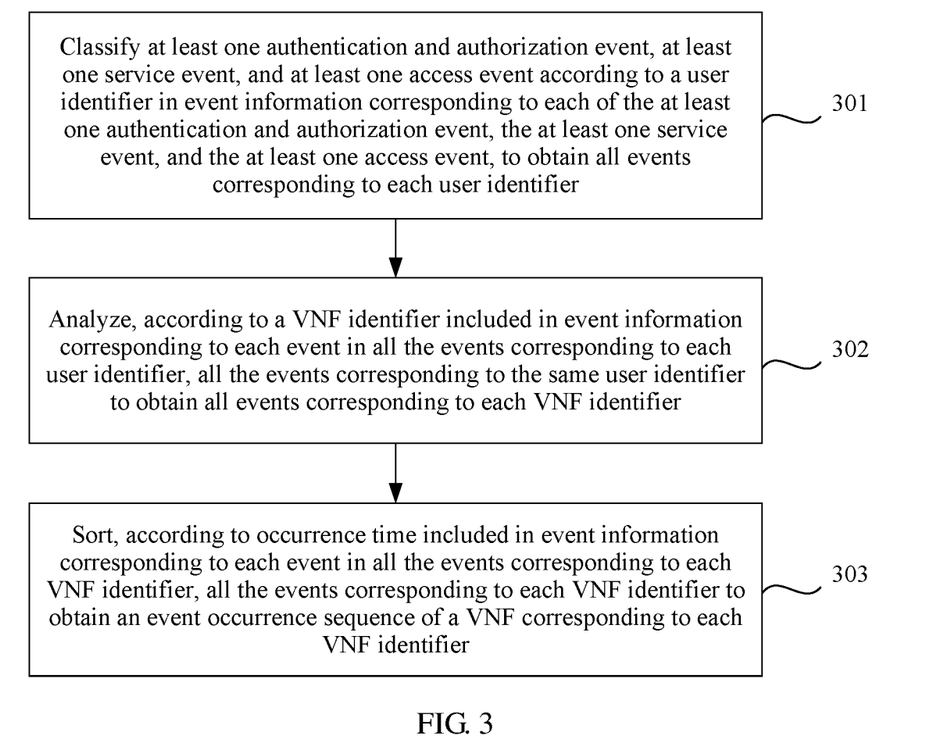
FIG. 3 is a schematic diagram of a process of obtaining an event occurrence sequence of each VNF in the method provided in FIG. 2.

With reference to FIG. 3, a process in which an event occurrence sequence of each VNF is obtained in step 202 is described in detail below using a specific embodiment. FIG. 3 is a schematic diagram of a process of obtaining an event occurrence sequence of each VNF in the method provided in FIG. 2. As shown in FIG. 3, the process includes the following steps.

Step 301: Classify at least one authentication and authorization event, at least one service event, and at least one access event according to a user identifier in event information corresponding to each of the at least one authentication and authorization event, the at least one service event, and the at least one access event, to obtain all events corresponding to each user identifier.

Step 302: Analyze, according to a VNF identifier included in event information corresponding to each event in all the events corresponding to each user identifier, all the events corresponding to the same user identifier to obtain all events corresponding to each VNF identifier.

Step 303: Sort, according to occurrence time included in event information corresponding to each event in all the events corresponding to each VNF identifier, all the events corresponding to each VNF identifier to obtain an event occurrence sequence of a VNF corresponding to each VNF identifier.

In this embodiment, first, according to the user identifier included in the event information corresponding to each reported event, all the events received by an audit apparatus are classified into different types according to different user identifiers. A same type of event corresponds to a same operation user. Then, all events of a same operation user are analyzed according to different VNF identifiers to obtain all events corresponding to each VNF identifier. All the events corresponding to each VNF identifier have a same operation user and a same operation object. Finally, events that have a same operation user and a same operation object are sorted according to a chronological order in order to obtain the event occurrence sequence of each VNF. Each event occurrence sequence indicates that an operation user performs which operations for a VNF according to the chronological order. All the reported events are summarized and classified in order to facilitate a user in making a more specific VNF preset policy, and facilitate subsequent auditing that is performed according to the preset policy, thereby improving audit efficiency.

A specific embodiment is used below to describe a manner of obtaining the foregoing event occurrence sequence.

The audit apparatus receives three authentication and authorization events reported by an authentication and authorization component, four service events reported by a service component, and four access events reported by a virtualized infrastructure.

Event information separately corresponding to the three authentication and authorization events A1, A2, and A4 may be separately and simply recorded as:

A1{user1, file1, 2015-12-20 15:10:27};
A2{user2, file2, 2015-12-20 16:10:27}; and
A4{user1, file4, 2015-12-20 20:10:27}.

Event information separately corresponding to the four service events B1, B2, B3, and B4 may be separately and simply recorded as:

B1{user1, file1, 2015-12-20 15:20:27};
B2{user2, file2, 2015-12-20 16:20:27};
B3{user3, file3, 2015-12-20 17:20:27}; and
B4{user1, file4, 2015-12-20 20:20:27}.

Event information separately corresponding to the four access events C1, C2, C3, and C4 may be separately and simply recorded as:

C1{user1, file1, 2015-12-20 15:30:27};
C2{user2, file2, 2015-12-20 16:30:27};
C3{user3, file3, 2015-12-20 17:30:27}; and
C4{user1, file4, 2015-12-20 20:30:27}.

First, according to different user identifiers in the event information separately corresponding to all the events A1, A2, A4, B1, B2, B3, B4, C1, C2, C3, and C4 (eleven in total), the audit apparatus can find three types, user1, user2, and user3, and classifies the eleven events into three types.

Type 1: all events whose operation user is user1, six in total, A1, A4, B1, B4, C1, and C4;

Type 2: all events whose operation user is user2, three in total, A2, B2, and C2; and Type 3: all events whose operation user is user3, two in total, B3 and C3.

Then, the audit apparatus analyzes events with a same VNF identifier according to different VNF identifiers in event information corresponding to all events of each type.

In type 1, the events A1, B1, and C1 corresponding to a same VNF identifier and the events A4, B4, and C4 corresponding to another VNF identifier can be obtained, that is, A1, B1, and C1 are the events triggered and reported because the operation user user1 operates on file1, and A4, B4, and C4 are the events triggered and reported because the operation user user1 operates on file4.

In type 2, the events A2, B2, and C2 corresponding to a same VNF identifier can be obtained, that is, A2, B2, and C2 are the events triggered and reported because the operation user user2 operates on file2.

In type 3, the events B3 and C3 corresponding to a same VNF identifier can be obtained, that is, B3 and C3 are the events triggered and reported because the operation user user3 operates on file3.

Finally, the events of all groups, that is, A1, B1, and C1; A4, B4, and C4; A2, B2, and C2; and B3 and C3, are respectively sorted according to occurrence time to obtain four event occurrence sequences, that is, A1, B1, and C1; A4, B4, and C4; A2, B2, and C2; and B3 and C3.

After the four event occurrence sequences are obtained, it is visual to find that the event occurrence sequence constituted by B3 and C3 lacks an event reported by the authentication and authorization component. This indicates that the operation performed on file3 by user3 is not authenticated and authorized, and file3 may be considered as a malicious VNF. According to different operation users, operation objects, and occurrence time of events, all the events are arranged to obtain a more obvious and visual event occurrence sequence of each VNF in order to improve an audit speed. Therefore, a malicious VNF may be visually and quickly detected by obtaining an event occurrence sequence in order to reduce a missed detection rate.

Based on the embodiment in FIG. 3, a specific audit manner of an event occurrence sequence is described in detail below with reference to different preset rules.

For example, an audit process for different preset rules includes the following possible implementations.

Possible Implementation 1.

The event information corresponding to each of the at least one authentication and authorization event, the at least one service event, and the at least one access event includes a module number invoked by a VNF operation corresponding to the event, and an audit process of a VNF includes determining, for the event occurrence sequence of each VNF, a module sequence constituted by module numbers that are invoked by VNF operations and that are included in event information corresponding to all events in the event occurrence sequence, determining whether the module sequence conforms to a preset module sequence, and obtaining an audit result that the VNF is an authorized VNF if the module sequence conforms to the preset module sequence, or obtaining an audit result that the VNF is a malicious VNF if the module sequence does not conform to the preset module sequence.

Further, the preset module sequence may be determined according to a module sequence constituted by module numbers that are invoked by VNF operations and that are included in event information corresponding to all events in an event occurrence sequence triggered when an authorized user creates a VNF. The preset module sequence limits modules that need to be successively invoked by an authorized VNF operation according to a chronological order. When it is found that a module invoking status in the event occurrence sequence is inconsistent with a module invoking status indicated by the preset module sequence, a VNF corresponding to the event occurrence sequence may be determined as a malicious VNF. Therefore, warning information is output.

For example, the audit apparatus receives one authentication and authorization event A1 reported by the authentication and authorization component, one service event B1 reported by the service component, and one access event C1 reported by the virtualized infrastructure. Event information separately corresponding to A1, B1, and C1 may be separately and simply recorded as:

A1{user1, file1, 1, 2015-12-20 15:10:27};
B1{user1, file1, 2, 3, 2015-12-20 15:20:27}; and
C1{user1, file1, 4, 2015-12-20 15:30:27}.

First, an event occurrence sequence A1, B1, and C1 can be obtained according to the embodiment in FIG. 3. A module sequence {1, 2, 3, 4} corresponding to the event occurrence sequence can be formed according to module numbers 1, 2, 3, and 4 that are invoked by VNF operations and that are included in the event information corresponding to all events in the event occurrence sequence. Then, the module sequence is compared with the preset module sequence to determine whether the two sequences are consistent. For example, when the preset module sequence is {1, 2, 3, 4}, an audit result that a VNF corresponding to the event occurrence sequence is an authorized VNF can be obtained. When the preset module sequence is {1, 2, 3, 4, 5}, it can be found that the module sequence corresponding to the current event occurrence sequence is inconsistent with the preset module sequence such that an audit result that a VNF corresponding to the event occurrence sequence is a malicious VNF can be obtained, and warning information is generated.

Possible Implementation 2.

The event information corresponding to each of the at least one authentication and authorization event, the at least one service event, and the at least one access event includes occurrence time of a VNF operation corresponding to the event, and an audit process of a VNF further includes determining, for the event occurrence sequence of each VNF, execution duration of each event in the event occurrence sequence according to occurrence time included in event information corresponding to each event in the event occurrence sequence, determining whether the execution duration of each event is less than preset duration, and obtaining an audit result that the VNF is a malicious VNF if an event whose execution duration is greater than or equal to the preset duration exists, or obtaining an audit result that the VNF is an authorized VNF if the execution duration of each event is less than the preset duration.

Further, execution duration of each event in an event occurrence sequence of an authorized VNF may be determined according to occurrence time included in event information corresponding to all events in the event occurrence sequence triggered when an authorized user creates the VNF. The preset duration may be set according to the execution duration. The preset duration limits longest interval time of each event in the event occurrence sequence corresponding to the VNF created by the authorized user. When it is found that execution duration of at least one of all the events indicated by the event occurrence sequence exceeds the preset duration, an audit result that a VNF corresponding to the event occurrence sequence is a malicious VNF can be obtained. Therefore, warning information is output.

For example, referring to the specific example in the possible implementation 1, event information corresponding to an event occurrence sequence A1, B1, and C1 is shown as follows:

A1{user1, file1, 1, 2015-12-20 15:10:27};
B1{user1, file1, 2, 3, 2015-12-20 16:10:27}; and
C1{user 1, file1, 4, 2015-12-20 16:30:27}.

According to occurrence time of A1 and B1, it can be learned that a user user1 spends one hour in the authentication and authorization component and then starts the event B1 in the service component. Considering that an authentication and authorization process may be usually completed within 10 minutes, preset duration may be set to 10 minutes. One hour in the event occurrence sequence obviously exceeds the preset duration. Therefore, an audit result that a VNF corresponding to the event occurrence sequence is a malicious VNF can be obtained.

For example, execution duration of the event C1 may be further determined according to a subsequent operation performed on file1 by the user user1, and preset duration may not be set for the event C1. Further, different preset duration may be set for events reported by different components.

Possible Implementation 3.

The event information corresponding to each of the at least one authentication and authorization event, the at least one service event, and the at least one access event includes an operation type and a user type of a VNF operation corresponding to the event, and an audit process of a VNF includes determining, for the event occurrence sequence of each VNF, a user type included in event information corresponding to each event in the event occurrence sequence and an operation type set corresponding to the user type, determining whether an operation type included in the event information corresponding to each event in the event occurrence sequence is in the operation type set corresponding to the user type included in the event information, and obtaining an audit result that the VNF is a malicious VNF when an operation type included in event information corresponding to at least one event is not in the operation type set corresponding to the user type included in the event information, or obtaining an audit result that the VNF is an authorized VNF when the operation type included in the event information corresponding to each event is in the operation type set corresponding to the user type included in the event information.

Further, different user types correspond to different user permission. Different executable operation types correspond to different operation type sets. An operation type range corresponding to the event occurrence sequence may be determined according to the user type included in the event information corresponding to each event in the event occurrence sequence and the operation type set corresponding to the user type. An audit process detects whether the operation type of each event in the event occurrence sequence is in the operation type set of the event occurrence sequence. When the set range is exceeded, an audit result that a VNF corresponding to the current event occurrence sequence is a malicious VNF is obtained. Therefore, warning information is output.

For example, still referring to the specific example in the possible implementation 1, event information corresponding to an event occurrence sequence A1, B1, and C1 is shown as follows:

A1{user1, file1, create, 1, 2015-12-20 15:10:27};
B1{user1, file1, create, 2, 3, 2015-12-20 16:10:27}; and
C1{user1, file1, create, 4, 2015-12-20 16:30:27}.

According to a user identifier user1 of the event occurrence sequence, a user type to which a current operation user user1 belongs is determined to be a common user. An operation type set {delete, pause} corresponding to the current operation user may be further determined. That is, the current operation user user1 can perform only deletion and pause operations, and cannot perform a creation operation. That is, an operation type in event information corresponding to each event in the event occurrence sequence is not in the operation type set corresponding to the user type of the event occurrence sequence. The current operation user user1 performs an operation beyond permission of the user, and an audit result that a VNF corresponding to the current event occurrence sequence is a malicious VNF can be obtained.

For example, as long as event information corresponding to one event in an event occurrence sequence includes an operation type of a VNF operation, this possible implementation can be used to perform a VNF audit.

Figure 4:
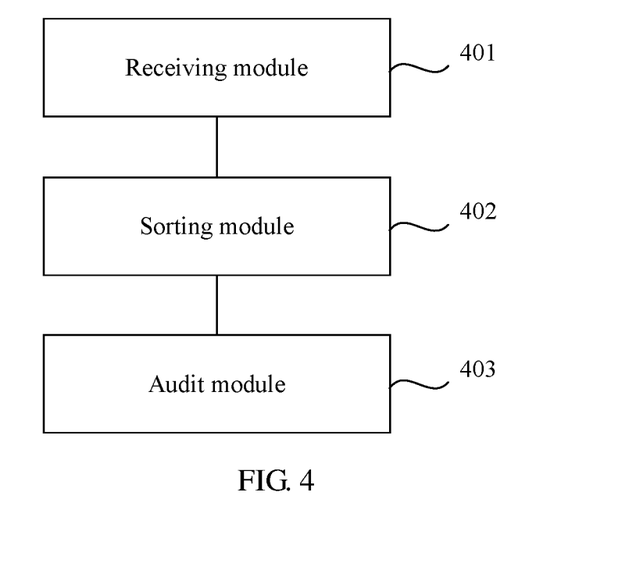
FIG. 4 is a schematic structural diagram of a VNF audit apparatus according to an embodiment of the present disclosure.

Another aspect of the embodiments of the present disclosure provides a VNF audit apparatus configured to audit a VNF generated by a platform that includes an authentication and authorization component, a service component, and a virtualized infrastructure. The apparatus can perform the VNF audit method in any one of the foregoing embodiments. An implementation principle and a technical effect of the apparatus are similar to those of the method. Details are not described herein. FIG. 4 is a schematic structural diagram of a VNF audit apparatus according to an embodiment of the present disclosure. As shown in FIG. 4, the apparatus includes a receiving module 401 configured to receive at least one authentication and authorization event that is triggered by a first VNF operation and reported by the authentication and authorization component, receive at least one service event that is triggered by a second VNF operation and reported by the service component, and receive at least one access event that is triggered by a third VNF operation and reported by the virtualized infrastructure, a sorting module 402 configured to obtain an event occurrence sequence of each VNF according to the at least one authentication and authorization event, the at least one service event, and the at least one access event, where an event occurrence sequence is used to indicate an occurrence order of multiple events corresponding to one VNF, and an audit module 403 configured to audit the event occurrence sequence of each VNF to obtain an audit result of the VNF.

Optionally, based on the embodiment in FIG. 4, the sorting module is described in detail. The sorting module 402 is further configured to classify the at least one authentication and authorization event, the at least one service event, and the at least one access event according to a user identifier in event information corresponding to each of the at least one authentication and authorization event, the at least one service event, and the at least one access event, to obtain all events corresponding to each user identifier, analyze, according to a VNF identifier included in event information corresponding to each event in all the events corresponding to each user identifier, all the events corresponding to the same user identifier to obtain all events corresponding to each VNF identifier, and sort, according to occurrence time included in event information corresponding to each event in all the events corresponding to each VNF identifier, all the events corresponding to each VNF identifier to obtain an event occurrence sequence of a VNF corresponding to each VNF identifier.

Optionally, the event information corresponding to each of the at least one authentication and authorization event, the at least one service event, and the at least one access event includes a module number invoked by a VNF operation corresponding to the event. The audit module 403 is further configured to determine, for the event occurrence sequence of each VNF, a module sequence constituted by module numbers that are invoked by VNF operations and that are included in event information corresponding to all events in the event occurrence sequence, determine whether the module sequence conforms to a preset module sequence, and obtain an audit result that the VNF is a malicious VNF if the module sequence does not conform to the preset module sequence.

Optionally, the event information corresponding to each of the at least one authentication and authorization event, the at least one service event, and the at least one access event includes occurrence time of a VNF operation corresponding to the event. The audit module 403 is further configured to determine, for the event occurrence sequence of each VNF, execution duration of each event in the event occurrence sequence according to occurrence time included in event information corresponding to each event in the event occurrence sequence, determine whether the execution duration of each event is less than preset duration, and obtain an audit result that the VNF is a malicious VNF if an event whose execution duration is greater than or equal to the preset duration exists.

Optionally, the event information corresponding to each of the at least one authentication and authorization event, the at least one service event, and the at least one access event includes an operation type and a user type of a VNF operation corresponding to the event. The audit module 403 is further configured to determine, for the event occurrence sequence of each VNF, a user type included in event information corresponding to each event in the event occurrence sequence and an operation type set corresponding to the user type, determine whether an operation type included in the event information corresponding to each event in the event occurrence sequence is in the operation type set corresponding to the user type included in the event information, and obtain an audit result that the VNF is a malicious VNF when an operation type included in event information corresponding to at least one event is not in the operation type set corresponding to the user type included in the event information.

Optionally, if the audit result is that the VNF is a malicious VNF, the audit module 403 is further configured to output warning information.

Still another aspect of the embodiments of the present disclosure provides a VNF audit apparatus configured to audit a VNF generated by a platform that includes an authentication and authorization component, a service component, and a virtualized infrastructure. The apparatus can perform the VNF audit method in any one of the foregoing embodiments. An implementation principle and a technical effect of the apparatus are similar to those of the method. Details are not described herein. The apparatus includes a receiver configured to receive at least one authentication and authorization event that is triggered by a first VNF operation and reported by the authentication and authorization component, receive at least one service event that is triggered by a second VNF operation and reported by the service component, and receive at least one access event that is triggered by a third VNF operation and reported by the virtualized infrastructure, and a processor configured to obtain an event occurrence sequence of each VNF according to the at least one authentication and authorization event, the at least one service event, and the at least one access event that are received by the receiver, where an event occurrence sequence is used to indicate an occurrence order of multiple events corresponding to one VNF, and audit the event occurrence sequence of each VNF to obtain an audit result of the VNF.

Optionally, the apparatus further includes a memory configured to store all events received by the receiver. The processor performs a subsequent audit process according to all the events stored in the memory.

Optionally, the processor is further configured to classify the at least one authentication and authorization event, the at least one service event, and the at least one access event according to a user identifier in event information corresponding to each of the at least one authentication and authorization event, the at least one service event, and the at least one access event, to obtain all events corresponding to each user identifier, analyze, according to a VNF identifier included in event information corresponding to each event in all the events corresponding to each user identifier, all the events corresponding to the same user identifier to obtain all events corresponding to each VNF identifier, sort, according to occurrence time included in event information corresponding to each event in all the events corresponding to each VNF identifier, all the events corresponding to each VNF identifier to obtain an event occurrence sequence of a VNF corresponding to each VNF identifier, and audit the event occurrence sequence of each VNF to obtain the audit result of the VNF Optionally, the event information corresponding to each of the at least one authentication and authorization event, the at least one service event, and the at least one access event includes a module number invoked by a VNF operation corresponding to the event. The processor is further configured to determine, for the event occurrence sequence of each VNF, a module sequence constituted by module numbers that are invoked by VNF operations and that are included in event information corresponding to all events in the event occurrence sequence, determine whether the module sequence conforms to a preset module sequence, and obtain an audit result that the VNF is a malicious VNF if the module sequence does not conform to the preset module sequence.

Optionally, the event information corresponding to each of the at least one authentication and authorization event, the at least one service event, and the at least one access event includes occurrence time of a VNF operation corresponding to the event. The processor is further configured to determine, for the event occurrence sequence of each VNF, execution duration of each event in the event occurrence sequence according to occurrence time included in event information corresponding to each event in the event occurrence sequence, determine whether the execution duration of each event is less than preset duration, and if an event whose execution duration is greater than or equal to the preset duration exists, obtain an audit result that the VNF is a malicious VNF.

Optionally, the event information corresponding to each of the at least one authentication and authorization event, the at least one service event, and the at least one access event includes an operation type and a user type of a VNF operation corresponding to the event. The processor is further configured to determine, for the event occurrence sequence of each VNF, a user type included in event information corresponding to each event in the event occurrence sequence and an operation type set corresponding to the user type, determine whether an operation type included in the event information corresponding to each event in the event occurrence sequence is in the operation type set corresponding to the user type included in the event information, and when an operation type included in event information corresponding to at least one event is not in the operation type set corresponding to the user type included in the event information, obtain an audit result that the VNF is a malicious VNF.

Optionally, the apparatus further includes a transmitter configured to output warning information when the audit result is that the VNF is a malicious VNF.

Yet another aspect of the embodiments of the present disclosure provides a storage medium. The storage medium stores one or more programs. The one or more programs include an instruction, and when the instruction is invoked by a processor in a host, the host may be controlled to perform the VNF audit method in any one of the foregoing method embodiments.

The foregoing storage medium includes any medium that can store program code, such as a universal serial bus (USB) flash drive, a removable hard disk, a read-only memory (ROM), a random access memory (RAM), a magnetic disk, or an optical disc.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present disclosure.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

In the specification, claims, and accompanying drawings of the present disclosure, the terms "first," "second," "third," "fourth," and so on (if existent) are intended to distinguish between similar objects but do not necessarily indicate a specific order or sequence. It should be understood that the data termed in such a way are interchangeable in proper circumstances so that the embodiments of the present disclosure described herein can be implemented in orders except the order illustrated or described herein. Moreover, the terms "include," "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A virtual network function (VNF) audit method, used to audit a VNF generated by a platform comprising an authentication and authorization component, a service component, and a virtualized infrastructure, the method comprising:
receiving at least one authentication and authorization event triggered by a first VNF operation from the authentication and authorization component;
receiving at least one service event triggered by a second VNF operation from the service component;
receiving at least one access event triggered by a third VNF operation from the virtualized infrastructure;
obtaining an event occurrence sequence of each VNF according to the at least one authentication and authorization event, the at least one service event, and the at least one access event, an event occurrence sequence indicating an occurrence order of a plurality of events corresponding to one VNF; and
auditing the event occurrence sequence of each VNF to obtain an audit result of the VNF.

2. The method of claim 1, wherein obtaining the event occurrence sequence of each VNF comprises:
- classifying the at least one authentication and authorization event, the at least one service event, and the at least one access event according to a user identifier in event information corresponding to each of the at least one authentication and authorization event, the at least one service event, and the at least one access event to obtain all events corresponding to each user identifier;
- analyzing, according to a VNF identifier comprised in event information corresponding to each event in all the events corresponding to each user identifier, all events corresponding to the same user identifier to obtain all events corresponding to each VNF identifier; and
- sorting, according to occurrence time comprised in event information corresponding to each event in all the events corresponding to each VNF identifier, all the events corresponding to each VNF identifier to obtain an event occurrence sequence of a VNF corresponding to each VNF identifier.

3. The method of claim 2, wherein the event information corresponding to each of the at least one authentication and authorization event, the at least one service event, and the at least one access event comprises a module number invoked by a VNF operation corresponding to the event, and auditing the event occurrence sequence of each VNF to obtain the audit result of the VNF comprising:
- determining, for the event occurrence sequence of each VNF, a module sequence constituted by module numbers invoked by VNF operations comprised in event information corresponding to all events in the event occurrence sequence;
- determining whether the module sequence conforms to a preset module sequence; and
- obtaining an audit result indicating that the VNF is a malicious VNF when the module sequence does not conform to the preset module sequence.

4. The method of claim 2, wherein the event information corresponding to each of the at least one authentication and authorization event, the at least one service event, and the at least one access event comprises occurrence time of a VNF operation corresponding to the event, and auditing the event occurrence sequence of each VNF to obtain the audit result of the VNF comprising:
- determining, for the event occurrence sequence of each VNF, execution duration of each event in the event occurrence sequence according to occurrence time comprised in event information corresponding to each event in the event occurrence sequence;
- determining whether the execution duration of each event is less than preset duration; and
- obtaining an audit result indicating that the VNF is a malicious VNF when an event whose execution duration is greater than or equal to the preset duration exists.

5. The method of claim 2, wherein the event information corresponding to each of the at least one authentication and authorization event, the at least one service event, and the at least one access event comprises an operation type and a user type of a VNF operation corresponding to the event, and auditing the event occurrence sequence of each VNF to obtain the audit result of the VNF comprising:
- determining, for the event occurrence sequence of each VNF, a user type comprised in event information corresponding to each event in the event occurrence sequence and an operation type set corresponding to the user type;
- determining whether an operation type comprised in the event information corresponding to each event in the event occurrence sequence is in the operation type set corresponding to the user type comprised in the event information; and
- obtaining an audit result indicating that the VNF is a malicious VNF when an operation type comprised in event information corresponding to at least one event is not in the operation type set corresponding to the user type comprised in the event information.

6. The method of claim 1, wherein the audit result comprises that the VNF is a malicious VNF, and the method further comprises outputting warning information.

7. The method of claim 1, wherein event information corresponding to each of the at least one authentication and authorization event, the at least one service event, and the at least one access event includes an operation result or an image file type.

8. A virtual network function (VNF) audit apparatus configured to audit a VNF generated by a platform comprising an authentication and authorization component, a service component, and a virtualized infrastructure, the apparatus comprising:
- a receiver configured to:
  - receive at least one authentication and authorization event triggered by a first VNF operation from the authentication and authorization component;
  - receive at least one service event triggered by a second VNF operation from the service component; and
  - receive at least one access event triggered by a third VNF operation from the virtualized infrastructure;
- a processor coupled to the receiver and configured to:
  - obtain an event occurrence sequence of each VNF according to the at least one authentication and authorization event, the at least one service event, and the at least one access event, an event occurrence sequence indicating an occurrence order of a plurality of events corresponding to one VNF; and
  - audit the event occurrence sequence of each VNF to obtain an audit result of the VNF.

9. The apparatus of claim 8, wherein the processor is further configured to:
- classify the at least one authentication and authorization event, the at least one service event, and the at least one access event according to a user identifier in event information corresponding to each of the at least one authentication and authorization event, the at least one service event, and the at least one access event to obtain all events corresponding to each user identifier;
- analyze, according to a VNF identifier comprised in event information corresponding to each event in all the events corresponding to each user identifier, all events corresponding to the same user identifier to obtain all events corresponding to each VNF identifier; and
- sort, according to occurrence time comprised in event information corresponding to each event in all the events corresponding to each VNF identifier, all the events corresponding to each VNF identifier to obtain an event occurrence sequence of a VNF corresponding to each VNF identifier.

10. The apparatus of claim 9, wherein the event information corresponding to each of the at least one authentication and authorization event, the at least one service event, and the at least one access event comprises a module number invoked by a VNF operation corresponding to the corresponding event, and the processor being further configured to:

determine, for the event occurrence sequence of each VNF, a module sequence constituted by module numbers invoked by VNF operations comprised in event information corresponding to all events in the event occurrence sequence;

determine whether the module sequence conforms to a preset module sequence; and obtain an audit result indicating that the VNF is a malicious VNF when the module sequence does not conform to the preset module sequence.

11. The apparatus of claim 9, wherein the event information corresponding to each of the at least one authentication and authorization event, the at least one service event, and the at least one access event comprises occurrence time of a VNF operation corresponding to the event, and the processor being further configured to:

determine, for the event occurrence sequence of each VNF, execution duration of each event in the event occurrence sequence according to occurrence time comprised in event information corresponding to each event in the event occurrence sequence;

determine whether the execution duration of each event is less than preset duration; and obtain an audit result indicating that the VNF is a malicious VNF when an event whose execution duration is greater than or equal to the preset duration exists.

12. The apparatus according to claim 9, wherein the event information corresponding to each of the at least one authentication and authorization event, the at least one service event, and the at least one access event comprises an operation type and a user type of a VNF operation corresponding to the event, and the processor being further configured to:

determine, for the event occurrence sequence of each VNF, a user type comprised in event information corresponding to each event in the event occurrence sequence and an operation type set corresponding to the user type;

determine whether an operation type comprised in the event information corresponding to each event in the event occurrence sequence is in the operation type set corresponding to the user type comprised in the event information; and obtain an audit result indicating that the VNF is a malicious VNF when an operation type comprised in event information corresponding to at least one event is not in the operation type set corresponding to the user type comprised in the event information.

13. The apparatus of claim 8, further comprising a transmitter coupled to the processor and configured to output warning information when the audit result comprises that the VNF is a malicious VNF.

14. The apparatus of claim 8, wherein event information corresponding to each of the at least one authentication and authorization event, the at least one service event, and the at least one access event includes an operation result or an image file type.

15. A non-transitory storage medium storing one or more programs, the one or more programs comprising an instruction, and when the instruction is invoked by a processor in a host, the instruction causing the host to be configured to:

receive at least one authentication and authorization event triggered by a first virtual network function (VNF) operation from an authentication and authorization component;

receive at least one service event triggered by a second VNF operation from a service component;

receive at least one access event triggered by a third VNF operation from a virtualized infrastructure, the authentication and authorization component, the service component, and the virtualized infrastructure being comprised in a platform, and the platform being configured to generate a VNF;

obtain an event occurrence sequence of each VNF according to the at least one authentication and authorization event, the at least one service event, and the at least one access event, an event occurrence sequence indicating an occurrence order of a plurality of events corresponding to one VNF; and audit the event occurrence sequence of each VNF to obtain an audit result of the VNF.

16. The non-transitory storage medium of claim 15, wherein in a manner of obtaining the event occurrence sequence of each VNF, the instruction further causes the host to be configured to:

classify the at least one authentication and authorization event, the at least one service event, and the at least one access event according to a user identifier in event information corresponding to each of the at least one authentication and authorization event, the at least one service event, and the at least one access event to obtain all events corresponding to each user identifier;

analyze, according to a VNF identifier comprised in event information corresponding to each event in all the events corresponding to each user identifier, all events corresponding to the same user identifier to obtain all events corresponding to each VNF identifier; and sort, according to occurrence time comprised in event information corresponding to each event in all the events corresponding to each VNF identifier, all the events corresponding to each VNF identifier to obtain an event occurrence sequence of a VNF corresponding to each VNF identifier.

17. The non-transitory storage medium of claim 16, wherein the event information corresponding to each of the at least one authentication and authorization event, the at least one service event, and the at least one access event comprises a module number invoked by a VNF operation corresponding to the corresponding event, and in a manner of auditing the event occurrence sequence of each VNF to obtain the audit result of the VNF, the instruction further causing the host to be configured to:

determine, for the event occurrence sequence of each VNF, a module sequence constituted by module numbers invoked by VNF operations comprised in event information corresponding to all events in the event occurrence sequence;

determine whether the module sequence conforms to a preset module sequence; and obtain an audit result indicating that the VNF is a malicious VNF when the module sequence does not conform to the preset module sequence.

18. The non-transitory storage medium of claim 16, wherein the event information corresponding to each of the at least one authentication and authorization event, the at least one service event, and the at least one access event comprises occurrence time of a VNF operation corresponding to the corresponding event, and in a manner of auditing the event occurrence sequence of each VNF to obtain the audit result of the VNF, the instruction further causing the host to be configured to:

determine, for the event occurrence sequence of each VNF, execution duration of each event in the event occurrence sequence according to occurrence time comprised in event information corresponding to each event in the event occurrence sequence;

determine whether the execution duration of each event is less than preset duration; and obtain an audit result indicating that the VNF is a malicious VNF when an event whose execution duration is greater than or equal to the preset duration exists.

19. The non-transitory storage medium of claim 16, wherein the event information corresponding to each of the at least one authentication and authorization event, the at least one service event, and the at least one access event comprises an operation type and a user type of a VNF operation corresponding to the corresponding event, and in a manner of auditing the event occurrence sequence of each VNF to obtain the audit result of the VNF, the instruction further causing the host to be configured to:

determine, for the event occurrence sequence of each VNF, a user type comprised in event information corresponding to each event in the event occurrence sequence and an operation type set corresponding to the user type;

determine whether an operation type comprised in the event information corresponding to each event in the event occurrence sequence is in the operation type set corresponding to the user type comprised in the event information; and obtain an audit result indicating that the VNF is a malicious VNF when an operation type comprised in event information corresponding to at least one event is not in the operation type set corresponding to the user type comprised in the event information.

20. The non-transitory storage medium of claim 15, wherein the audit result comprises that the VNF is a malicious VNF, and the instruction further causes the host to be configured to output warning information.

* * * * *